United States Patent
Kim et al.

(10) Patent No.: US 8,378,582 B2
(45) Date of Patent: Feb. 19, 2013

(54) PLASMA LIGHTING SYSTEM

(75) Inventors: Jeongwon Kim, Changwon (KR);
Jonggil Jun, Changwon (KR); Seok Heo, Gyeongsangnam-do (KR);
Yongkwang Kim, Changwon (KR);
Gyusuk Hwang, Changwon (KR);
Jungsu Park, Changwon (KR);
Changsin Park, Changwon (KR);
Hyeonsoo Jung, Changwon (KR);
Jingon Chang, Changwon (KR); Hoon Kim, Changwon (KR); Youngchul Chae, Changwon (KR); Ilgyu Kang, Changwon (KR); Kyunghoon Park, Changwon (KR); Sungkyeom Kim, Changwon (KR)

(73) Assignee: LG Electronics Inc., Seoul (KR)

( * ) Notice: Subject to any disclaimer, the term of this patent is extended or adjusted under 35 U.S.C. 154(b) by 171 days.

(21) Appl. No.: 12/987,500

(22) Filed: Jan. 10, 2011

(65) Prior Publication Data

US 2012/0161629 A1 Jun. 28, 2012

(30) Foreign Application Priority Data

Dec. 28, 2010 (KR) .......................... 10-2010-0137182

(51) Int. Cl.
*H05B 41/16* (2006.01)
(52) U.S. Cl. ....... 315/248; 315/39; 315/39.51; 315/291; 315/307

(58) Field of Classification Search .................. 315/247, 315/248, 209 R, 291, 307, 224, 39, 39.51, 315/39.53, 39.69; 313/231, 231.61, 488
See application file for complete search history.

(56) References Cited

U.S. PATENT DOCUMENTS

| 5,646,354 | A | * | 7/1997 | Lovejoy | ..................... 73/861.95 |
| 7,161,303 | B2 | * | 1/2007 | Park et al. | ..................... 313/637 |
| 2010/0156295 | A1 | * | 6/2010 | Park et al. | ..................... 315/39 |

FOREIGN PATENT DOCUMENTS

| JP | 05-342997 A | 12/1993 |
| KR | 10-2001-0050569 A | 6/2001 |
| KR | 10-0565343 B1 | 3/2006 |
| KR | 10-0864657 B1 | 10/2008 |

OTHER PUBLICATIONS

Korean Office Action dated Jan. 4, 2012 issued in Application No. 10-2010-0137182.

* cited by examiner

*Primary Examiner* — Haiss Philogene
(74) *Attorney, Agent, or Firm* — Ked & Associates LLP

(57) ABSTRACT

A plasma lighting system is disclosed. Interference with an electronic device using the same band as that of the plasma lighting system can be avoided by changing the shape of vanes constituting a magnetron, and a filament current of the magnetron at an initial starting stage and that in a normal state are adjusted to be different, thus avoiding interference with a wireless LAN and attenuating noise, and a resonator has a mash form to increase efficiency. Because a rectangular waveguide is bent substantially at a right angle, and the magnetron and the resonator are disposed at one side on the basis of a waveguide space of the waveguide, thus reducing the size and an installation space of the plasma lighting system.

22 Claims, 12 Drawing Sheets

PLASMA LIGHTING SYSTEM

BACKGROUND OF THE INVENTION

1. Field of the Invention

The present invention relates to a plasma lighting system for avoiding communication interference with an electronic device, in particular, a wireless local area network (WLAN) device, using the same frequency band.

2. Description of the Related Art

In general, a plasma lighting system emits light by converting a luminous material (or an emitting material) encapsulated in an electrodeless bulb into plasma by using microwave energy generated from a microwave generation unit such as a magnetron. The plasma lighting system using an electrodeless bulb without an electrode has a long life span or is semi-permanent, and light emitted from the electrodeless bulb is tinged with light as good as natural light.

The plasma lighting system generally includes a magnetron generating microwave, an electrodeless bulb charged with a luminous material to generate light by using the microwave delivered from the magnetron, a resonator accommodating the electrodeless bulb and resonating the microwave delivered from the magnetron, and a waveguide connecting the magnetron and the resonator to deliver the microwave generated by the magnetron to the resonator.

In the plasma lighting system, microwave generated from the magnetron is delivered to the resonator through the waveguide, and as the microwave introduced into the resonator is resonated in the resonator, the luminous material of the electrodeless bulb is excited. Then, the luminous material charged in the electrodeless bulb is converted into plasma to generate light, and the light is irradiated to a front side by a reflector installed at a rear side of the electrodeless bulb.

Meanwhile, the related art plasma lighting system is designed by using a magnetron having a resonance frequency of 2450 MHz, causing channel interference with electronic devices, such as the WLAN, a microwave oven, RFID, Bluetooth™, and the like, using 2.4 GHz to 2.5 GHz band. In particular, the WLAN is one of communication network schemes, which wirelessly performs communication between connectors by using a radio frequency (RF). According to IEEE standard, WLAN uses microwave of 2.4 GHz, 5 GHz, or the like. As shown in FIG. 14, the related art plasma lighting system causes channel interference of 7 channels or larger with a WLAN device. When the plasma lighting system is installed in an area where the WLAN device is in use, a channel must be necessarily set not to cause interference therebetween or the usage frequency band of the WLAN device must be moved to 5 GHz.

Meanwhile, conventionally, in order to improve an initial starting characteristics (or startability, activation) of the plasma lighting system, the plasma lighting system is sufficiently initially heated with a filament current in consideration of a change in temperature characteristics over time, and then voltage is applied to high voltage driving unit of the magnetron. However, the related art plasma lighting system does not have a function of regulating the amount of electron emission, having a problem in that interference with WLAN occurs. In addition, because the related art plasma lighting system does not make a difference between initial heating current and an operation current, noise generated from the plasma lighting system causes communication interference with the WLAN.

SUMMARY OF THE INVENTION

Therefore, in order to address the above matters, the various features described herein have been conceived.

An aspect of the present invention provides a plasma lighting system capable of avoiding interference with an electronic device which uses the same frequency band as that of the plasma lighting system by simply changing the structure of a magnetron.

Another aspect of the present invention provides a plasma lighting system whose oscillation frequency can be regulated by changing the shape of vanes constituting a magnetron.

Another aspect of the present invention provides a plasma lighting system in which a filament current of a magnetron at an initial starting stage and a filament current of the magnetron in a normal state are differentiated to thus avoid interference with the wireless local area network (WLAN) and lengthen a life span of the magnetron.

According to an aspect of the present invention, there is provided an plasma lighting system including: a magnetron including a plurality of vanes having accommodating recesses at upper and lower end portions and two pairs of straps accommodated in the accommodating recesses such that they are respectively and alternately brought into contact with the accommodating recesses, said magnetron providing oscillating microwaves that have an oscillation frequency determined by the plurality of vanes and the straps; a waveguide connected to the magnetron and having a waveguide space to deliver the microwave; an electrodeless bulb charged with a luminous material and emitting light according to the microwaves; a resonator formed to have a mesh form and having a resonance space accommodating the electrodeless bulb and connected to the waveguide; a power source unit configured to convert commercial power into a driving voltage and a filament current and to apply the same to the magnetron; and a control unit configured to output a control signal for converting the commercial power into the driving voltage and the filament current to the power source unit and to provide control to apply a filament current, that has a lower magnitude than that applied at an initial starting stage, to the magnetron when a pre-set normal state arrives.

The oscillation frequency may be set to avoid interference with an external electronic device using a frequency of 2.4 GHz to 2.5 GHz band. Here, the distance between a vane which is not in contact with the straps, among the plurality of vanes, and the straps may be formed such that the oscillation frequency ranges from 2,480 MHz to 2,490 MHz.

The waveguide may include first and second waveguide parts formed to be bent in a direction in which the magnetron is coupled, and the magnetron and the resonator may be coupled to the first and second waveguide parts, respectively. Here, the first and second waveguide parts may be bent at a right angle and a sloped face may be formed on the bent portions, respectively. The waveguide may include an impedance matching member installed on the sloped face and matching impedance according to the strength of the microwave.

A slot may be formed between the waveguide and the resonator in order to induce double resonance.

According to an aspect of the present invention, there is provided a plasma lighting system including: a magnetron configured to oscillate a microwave; a power source unit including a rectifying module for converting commercial power into a DC voltage and a driving module for converting the DC voltage into a filament current and a driving voltage and applying the same to the magnetron according to a control signal; a waveguide connected to the magnetron and having a waveguide space to deliver the microwave; an electrodeless bulb charged with a luminous material excited by the microwave and turned into a plasma state to emit light; a resonator formed to have a mesh form and having a resonance space accommodating the electrodeless bulb and connected to the waveguide; and a control unit configured to output the control signal to the power source unit and provide control to apply a filament current lower than a filament current at an initial starting stage, to the magnetron when a pre-set normal state arrives, wherein the microwave has an oscillation frequency ranging from 2,480 MHz to 2,490 MHz.

The power source unit may apply a pre-set first current as the filament current at an initial starting stage, and change the filament current into a second current, which is smaller than the first current, or lower and apply the same in a pre-set normal state. Here, the first current may range from 9 A to 11 A, and the second current may range from 4 A to 7 A.

The magnetron may include: a anode cylinder formed at an inner side of a yoke and having a cylindrical shape; a plurality of vanes having accommodating recesses formed at upper and lower end portions and radially disposed in the interior of the anode cylinder to induce the microwave; and two pairs of straps accommodated in the accommodating recesses such that they are alternately brought into contact with the accommodating recesses. Here, the plurality of vanes and the two straps may form a resonance circuit, and a distance may be formed between the plurality of vanes and the straps not connected to the plurality of vanes in order to allow the microwave to have the oscillation frequency.

The plasma lighting system may further include: a light detection unit configured to detect light emitted by the electrodeless bulb. Here, the control unit may compare the number of pulses of the detected light and a reference number of pulses, and when the number of pulses of the detected light is greater than the reference number of pulses, the control unit may determine that the plasma lighting system is in a normal state. When an applied time (i.e., duration) of the first current is greater than a pre-set reference time, the control unit may apply the driving voltage to the magnetron and compare the numbers of pulses to determine whether or not the plasma lighting system is in a normal state.

A slot may be formed between the waveguide and the resonator in order to induce double resonance.

According to exemplary embodiments of the present invention, the distance between vanes and straps are determined by changing the shape of the vanes constituting the magnetron, whereby an oscillation frequency of the plasma lighting system can be changed and interference with an electronic device, e.g., a wireless LAN device, using the same frequency band as that of the plasma lighting system can be avoided.

Because interference with an electronic device, e.g., a WLAN device, using the same frequency band as that of the plasma lighting system is avoided, the reliability of the system can be improved, and because there is no need to change a usage frequency band of the WLAN device into a different frequency band, user convenience can be improved.

Because a filament current of the magnetron at an initial starting stage and that in a normal state are adjusted to be different, the magnetron can be stably driven at the initial starting stage, interference with the WLAN can be avoided in the normal operation, and the life span of the magnetron can be lengthened. Also, because the filament current is reduced, noise can be reduced and efficiency can be improved.

In addition, because the rectangular waveguide is bent at a right angle and the magnetron and the resonator are disposed on the basis of a waveguide space of the waveguide, a space between the magnetron and the resonator can be reduced, thus eliminating an unnecessary space within the casing and reducing the size of the plasma lighting system, and as a result, an installation space of the plasma lighting system can be reduced and installation working can be facilitated.

The foregoing and other objects, features, aspects and advantages of the present invention will become more apparent from the following detailed description of the present invention when taken in conjunction with the accompanying drawings.

DETAILED DESCRIPTION OF THE INVENTION

A plasma lighting system according to an exemplary embodiment of the present invention will now be described with reference to the accompanying drawings.

Figure 1:
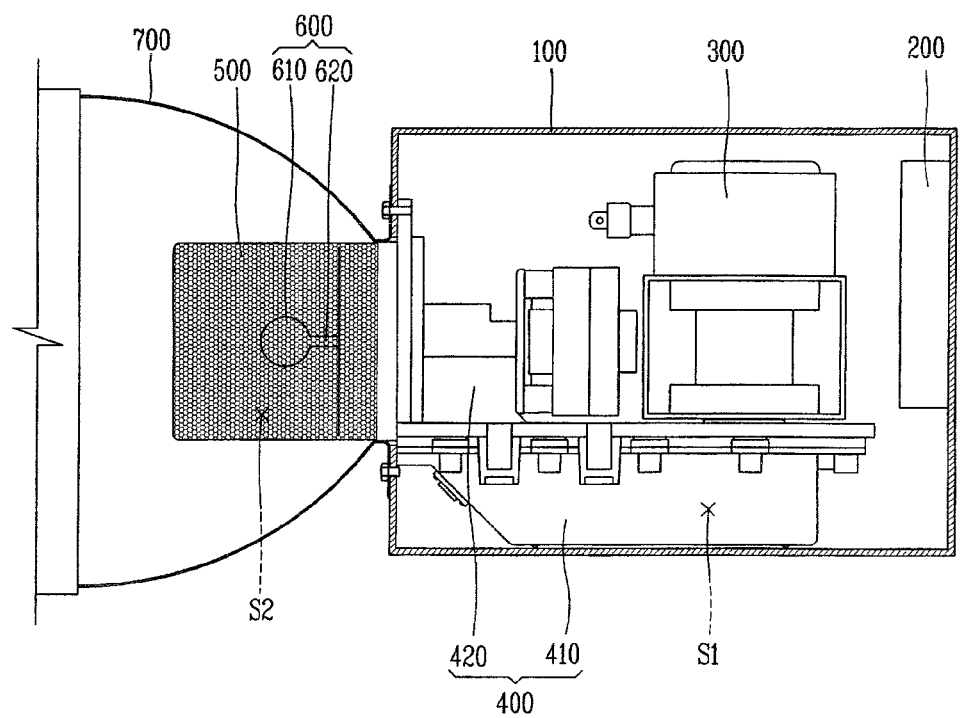
FIG. 1 is a front view showing the interior of a casing of a plasma lighting system viewed from the side according to an exemplary embodiment of the present invention.

With reference to FIG. 1, an plasma lighting system according to an exemplary embodiment of the present invention may include a magnetron 300 including a plurality of vanes having accommodating recesses at upper and lower end portions and two pairs of straps accommodated in the accommodating recesses such that they are respectively and alternately brought into contact with the accommodating recesses, said magnetron providing oscillating microwaves that have an oscillation frequency determined by the plurality of vanes and the straps; a waveguide 400 connected to the magnetron 300 and having a waveguide space to deliver the microwave; an electrodeless bulb 600 charged with a luminous material and emitting light according to the microwaves; a resonator 500 formed to have a mesh form and having a resonance space accommodating the electrodeless bulb 600 and connected to the waveguide 400; a power source unit 200 configured to convert commercial power into a driving voltage and a filament current and to apply the same to the magnetron 300; and a control unit (not shown) configured to output a control signal for converting the commercial power into the driving voltage and the filament current to the power source unit and to provide control to apply a filament current, that has a lower magnitude than that applied at an initial starting stage, to the magnetron when a pre-set normal state arrives. The magnetron 300 and the waveguide 400 are installed in an internal space of the casing 100, and the resonator 500 is installed at an outer side of the casing 100. The plasma lighting system may further include a reflector 700 for concentrating light emitted from the electrodeless bulb 600 to a front side.

With reference to FIG. 1, the waveguide 400 includes a first waveguide part 410 having a waveguide space in a rectangular shape and connected to the magnetron 300 and a second waveguide part 420 bent from the first waveguide part 410 to have the continued waveguide space S1 and communicating with a resonance space S2 of the resonator 500 (to be described).

Figure 2:
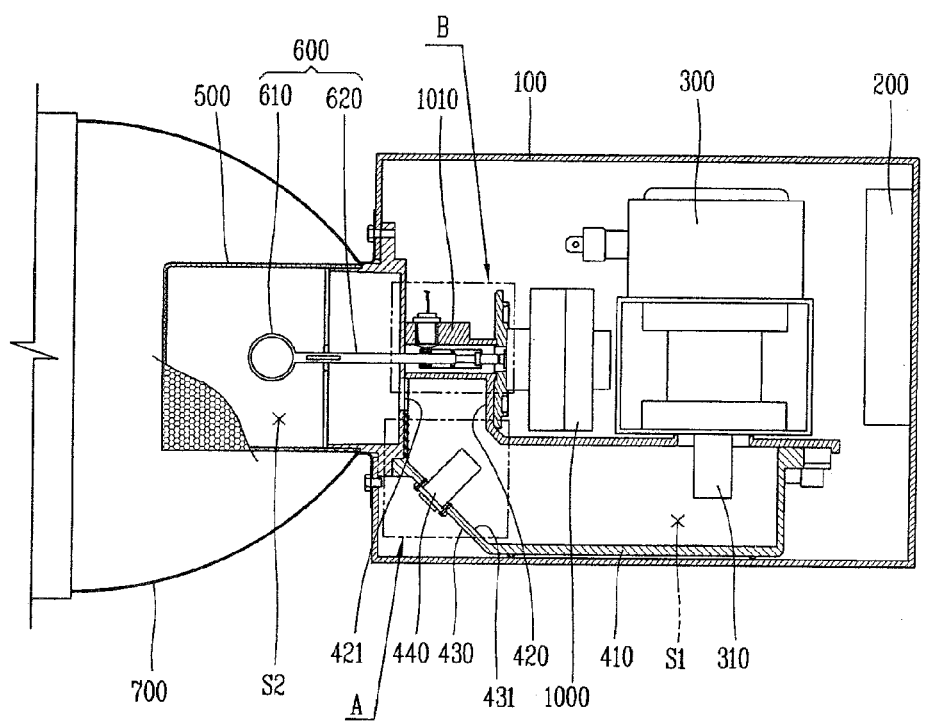
FIG. 2 is a sectional front view showing a waveguide and a resonator of FIG. 1 viewed from the side.

With reference to FIG. 2, the first waveguide part 410 and the second waveguide part 420 are connected through the waveguide space S1, and cross sections of the first and second waveguides 410 and 420 are substantially equal. An introduction hole is formed at one side of the first waveguide part 410 to allow an antenna unit 310 of the magnetron 300 to be inserted therethrough, and a slot (or a coupling slot) 421 (referred to as an 'emission slot', hereinafter) may be formed on one side face, namely, an outer face, of the second waveguide part 420, such that it communicates with the waveguide space S1. Preferably, the emission slot 421 is formed at the center of the waveguide 400. Namely, because the electrodeless bulb 600 is positioned at the center of the waveguide 400, the emission slot 421 is preferably formed near the electrodeless bulb 600, namely, at a position at which an electric field can be increased to have a highest value. The emission slot 421 may be formed to have a shape corresponding to the shape of the cross section of the resonator 500 in order to facilitate coupling of the resonator. The emission slot 421 changes a resonance mode in the waveguide into a resonance mode in the resonator. For example, the emission slot 421 changes a transverse electric (TE) mode into a transverse magnetic (TM) mode. Accordingly, the emission slot 421 allows the plasma lighting system to form double resonance.

With reference to FIG. 2, the resonator 500 may have a container-like shape having the resonance space S2 in which the electrodeless bulb 600 is accommodated. One end, namely, an end, of the resonator is covered and the other end, namely, a rear end, of the resonator is open to form a resonance mode in the resonance space S2. One side of the resonator 500, namely, a portion in which a light emitting unit 610 of the electrodeless bulb 600 is accommodated, has a mesh form in order to keep a microwave and emit light. The other side of the resonator 500, namely, a portion fixed to the waveguide 400, includes a fixing unit having a circular band shape without a mesh.

The magnetron 300 is coupled such that a lengthwise direction of the antenna unit 310 is perpendicular to a lengthwise direction of the first waveguide 410, and the resonator 500 is coupled such that an axial center of the resonator 500 is perpendicular to the lengthwise direction of the second waveguide 420. Thus, the installation direction of the magnetron 300 and that of the resonator 500 are substantially perpendicular.

Figure 3:
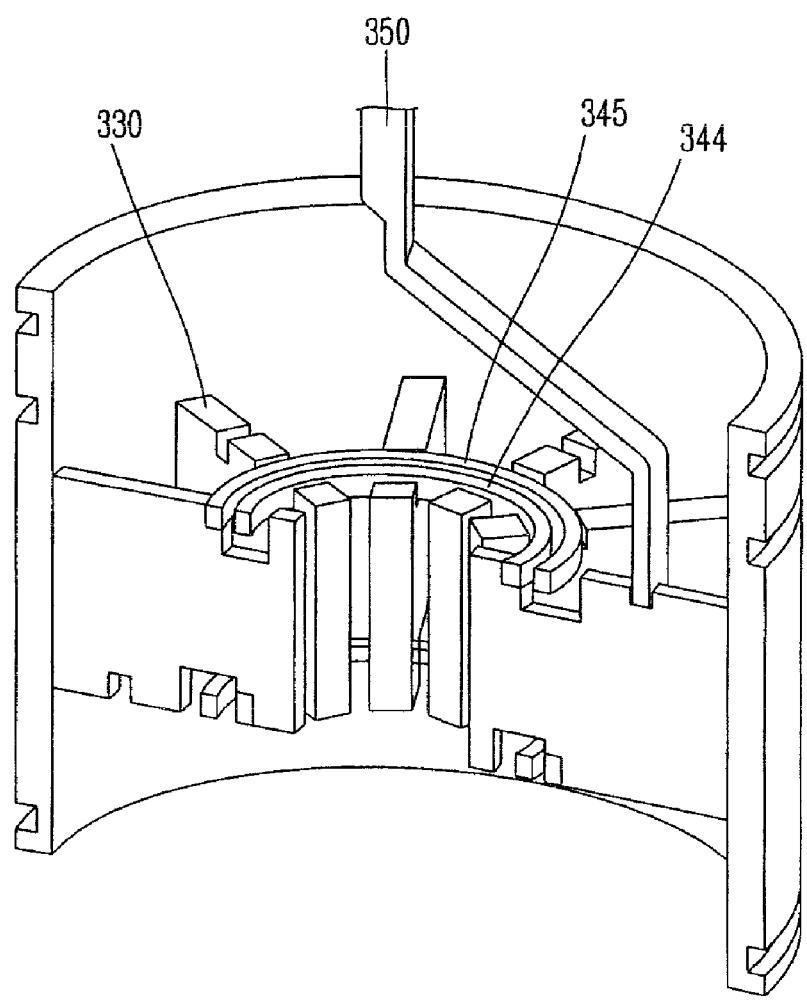
FIG. 3 is a perspective view showing an anode including a vane and a strap of a magnetron in the plasma lighting system according to an exemplary embodiment of the present invention.

With reference to FIG. 3, the magnetron 300 includes a plurality of vanes 330 each having an accommodating recess formed at upper and lower end portions and two pairs of straps 344 and 345 accommodated in the respective accommodating recesses of the plurality of vanes 330 such that they are alternately brought into contact with the accommodating recesses, and oscillates a microwave having an oscillation frequency determined by the plurality of vanes and the straps. Here, the overall shape of the magnetron of FIG. 15 and other elements constituting the magnetron can be applicable to the present invention as it is.

Figure 15:
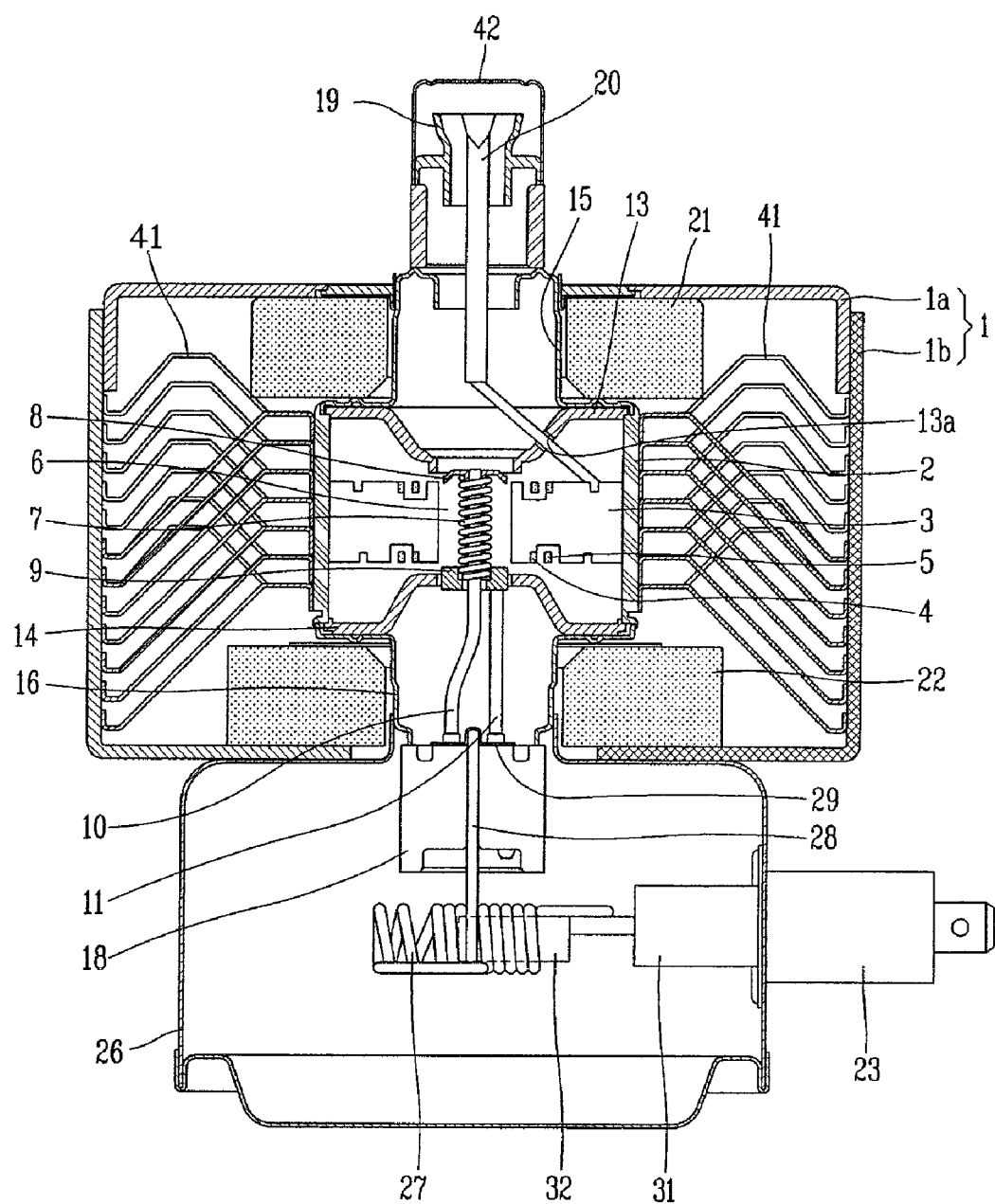
FIG. 15 is a perspective view showing the configuration of a magnetron of a general plasma lighting system.

First, with reference to FIG. 15, in the magnetron, an upper yoke 1a and a lower yoke 1b are coupled in a quadrangular shape to constitute a yoke 1. An anode cylinder 2 is installed at an inner side of the yoke 1, and a plurality of vanes 3, which form a common resonator in order to induce a microwave component to the interior of the anode cylinder 2, are disposed in a radial form toward an axial core in the interior of the anode cylinder 2, and an inner strap 4 and an outer strap 5 are coupled at upper and lower end portions of the vanes 3 such that they are alternately connected thereto, thus allowing the anode cylinder 2 and the vanes 3 to form an anode.

A filament 7 wound in a spiral form is installed on a central axis of the anode cylinder 2 to form an operation space 6 spaced apart from the end portions of the vanes 3. The filament 7 is made of a mixture of tungsten and thorium oxide and constitutes a cathode part heated by a supplied operation current to emit heat electrons.

A top shield 8 is fixed at an upper end portion of the filament 7 in order to prevent the emitted heat electrons from being radiated in an upward direction, and an end shield 9 is fixed to a lower end portion of the filament 7 in order to prevent the emitted heat electrons from being radiated in a downward direction. A center lead 10 made of molybdenum is inserted into a through hole formed at a central portion of the end shield 9 is fixedly junctioned to a lower surface of the top shield 8. A side lead 11 made of a molybdenum material is installed to be spaced apart from the center lead 10, and an upper end portion of the side lead 11 is fixedly junctioned to the lower end of the top shield 8.

An upper pole piece 13 and a lower pole piece 14, each formed of a magnetic body and having a funnel shape, are coupled to upper and lower openings of the anode cylinder 2. A cylindrical A-chamber 15 and a cylindrical F-chamber 16 are junctioned through brazing at an upper side of the upper pole piece 13 and a lower side of the lower pole piece 14. An A-ceramic for outputting microwave to outside and an F-ceramic 18 for insulation are junctioned through brazing at an upper side of the A-chamber 15 and the F-chamber 16. An exhaust tube 19 is junctioned through brazing at an upper side of the A-ceramic. An upper end portion of the exhaust tube 19 is junctioned upon being cut in order to hermetically seal the interior of the anode cylinder 2 into a vacuum state.

An antenna 20 is installed in the interior of the A-chamber 15 in order to output RF oscillated in the common resonator. A lower end portion of the antenna 20 is connected to one of the vanes 3, and an upper end portion of the antenna 20 is fixed to an upper surface of the interior of the exhaust tube 19.

An upper magnet 21 and a lower magnet 22 are coupled at upper and lower sides of the anode cylinder 2 such that they are in contact with an inner side of the yoke 1, in order to form a magnetic field along with the upper and lower pole pieces 13 and 14

A filter box 26 is coupled to a lower portion of the yoke 1, and a pair of choke coils 27 are installed at an inner side of the filter box 26 in order to attenuate harmonic noise flowing backward into an input unit. One end portions of the pair of choke coils 27 are electrically connected to the lower end portions of the pair of F-leads 28 insertedly coupled to a through hole formed at the F-ceramic 18.

Upper end portions of the F-leads 28 insertedly coupled to the through hole of the F-ceramic 18 are junctioned to a lower surface of a pair of disks 29 installed at an upper portion of the F-ceramic 18, and lower end portions of the center lead 10 and the side lead 11 are junctioned to an upper surface of the disks 29.

A capacitor 31 is installed on a side wall of the filter box 26. An inner end portion of the capacitor 31 is electrically connected to the choke coil 27, and a ferrite for absorbing low frequency noise is inserted in a lengthwise direction.

Cooling pins 41 are installed between an inner circumferential surface of the yoke 1 and an outer circumferential surface of the anode cylinder 2, and an antenna cap 42 is provided on the upper portion of the A-ceramic 17 in order to protect the junction part of the exhaust tube 19.

Figure 4:
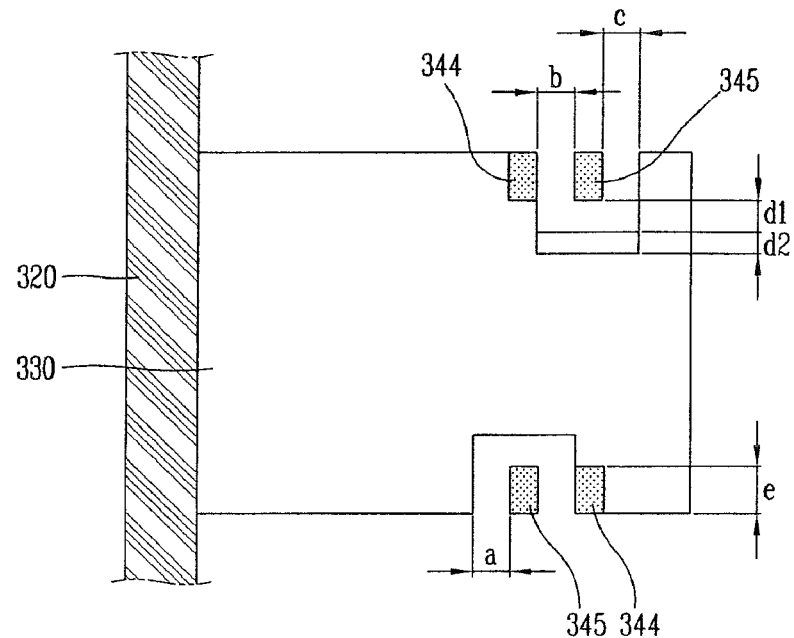
FIG. 4 is a cross-sectional view showing a connection relationship of the vane and the strap of the magnetron in the plasma lighting system according to an exemplary embodiment of the present invention.
Figure 5:
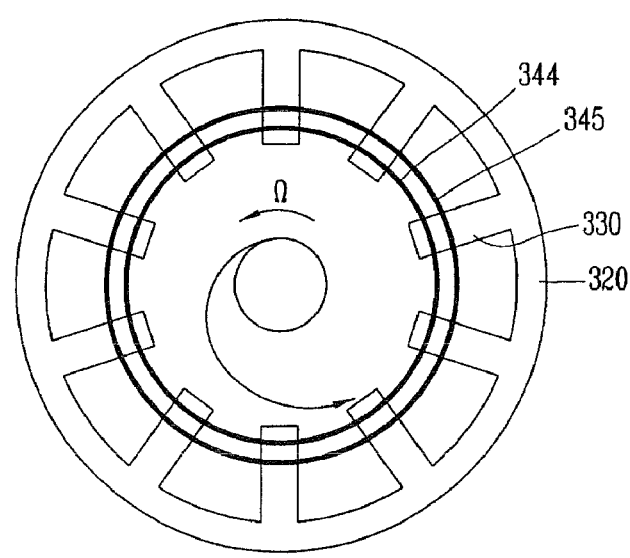
FIG. 5 is a vertical sectional view showing a connection relationship of the vane and the strap of the magnetron in the plasma lighting system according to an exemplary embodiment of the present invention.
Figure 6:
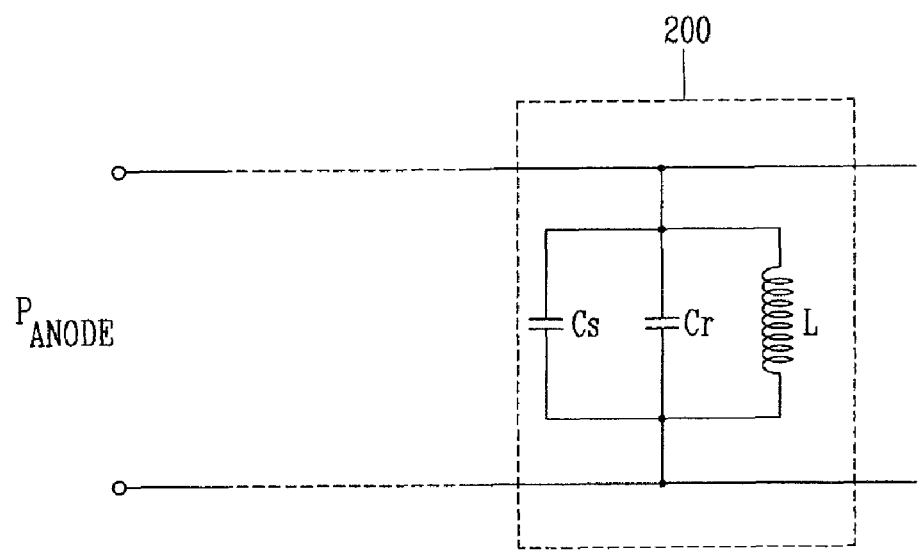
FIG. 6 is an equivalent circuit diagram of a resonance circuit formed by the vane and the strap of the magnetron in the plasma lighting system according to an exemplary embodiment of the present invention.

With reference to FIGS. 3 and 4, the magnetron 300 includes an anode cylinder 320 provided at an inner side of the yoke and the plurality of vanes 330 radially disposed at the inner side of the anode cylinder and inducing a microwave component. Two pairs of straps 344 and 345 accommodated to be alternately brought into contact with the accommodating recesses form an anode. FIG. 6 shows a resonance circuit formed accordingly. Namely, when power is applied to the anode through the power source unit 200, the anode forms a resonance circuit to oscillate microwave. As shown in FIG. 5, an electron group, which is formed by the movement of electrons according to the applied anode power, causes interference at the vanes 330, whereby the interference has a periodic interval of an amount that equals to a reciprocal of a multiple of the microwave oscillation frequency. According to this operation, a capacitance component of an electrostatic capacity acting between the facing vanes 330 in the resonator and an inductance component formed by the facing vanes 330 and the anode cylinder 320 connecting them constitute a parallel resonance circuit on the circuit. A resonance frequency $$f = \frac{1}{2\pi\sqrt{LC}}$$

is determined by the parallel resonance circuit, and microwave having the resonance frequency is induced from the vanes 330 and radiated to outside through the antenna 350. In this case, the magnetron 300 stably oscillates in the form of π mode in which a high frequency potential of the adjacent vanes 330 is the converse.

With reference to FIG. 4, a is a gap between the second strap 345 and the vane 330, b is a gap between the first strap 344 and the second strap, c is a gap between the second strap 34 and the vane 330, d1 and d2 are an separation distance between the second strap 345 and the vane 330, and e is the thickness of the straps 344 and 345. In general, the thickness e of the straps 344 and 345 is approximately 1.30 millimeters. In the case of the plasma lighting system having the oscillation frequency of 2,450 MHz, the distance or gap of a, b, c, and d1 is used to be uniform, which is 0.70 millimeters to 0.75 millimeters. However, in this case, inference with the WLAN device takes place as described above.

With the different distances or gaps (a, b, and c) according to an exemplary embodiment maintained, the oscillation frequency may be changed by adding d2 to the separation distance d1 between the second strap 345 and the vane 330. For example, when the oscillation frequency ranging from 2,480 MHz to 2,490 MHz is intended to be used, an overall separation distance d between the second strap 345 and the vane 330 can be increased by adding d2 of 0.20 millimeters or larger to the separation distance d1 when the oscillation frequency of the microwave is 2,450 MHz. Namely, when the overall separation distance d between the second strap 345 and the vane 330 is increased, the frequency of the oscillated microwave is changed to 2,480 MHz or 2,490 to MHz and interference with an external electronic device, e.g., a WLAN device, Bluetooth™, or the like, using the frequency of 2.4 GHz band can be reduced or avoided. Of course, the oscillation frequency of the microwave can be changed by changing the distance or gap of other parts.

FIG. 6 is an equivalent circuit diagram of a resonance circuit formed by the vane and the strap of the magnetron in the plasma lighting system according to an exemplary embodiment of the present invention. As shown in FIG. 6, when the shape of the vane 330 is changed, the inductance (L) and the capacitance (C) in the anode change, and accordingly, the oscillation frequency, namely, the resonance frequency, of the magnetron is changed. As described above, the resonance frequency of the magnetron can be expressed as $$f = \frac{1}{2\pi\sqrt{LC}}.$$

Here, L is an inductance value of the anode, and C is the sum of Cr and Cs. Cr is the sum of a resonator capacitance and a fringing capacitance generated from the edge of each element. Meanwhile, Cs is capacitance between the vane 330 and the strap 345. When the separation distance d (=d1+d2) between the second strap 345 and the vane 330 increases, the capacitance Cs between the vane 330 and the strap 345 is reduced. Also, when the capacitance Cs is reduced, the overall capacitance is reduced and the oscillation frequency of the magnetron, namely, the resonance frequency, is increased.

The plasma lighting system further includes a power source unit 200 for converting commercial power into a driving voltage and a filament current and apply the same to the magnetron, and a control unit 800 configured to output a control signal for converting the commercial power into the driving voltage and the filament current to the power source unit and provide control to apply a filament current lower than a filament current at an initial starting stage, to the magnetron 300 when a pre-set normal state arrives.

The power source unit 200 includes a rectifying module 210 configured to convert the commercial power into a DC voltage, and a driving module 230 configured to convert the DC voltage into the driving voltage and the filament current.

The rectifying module 210 receives commercial AC power by using a bridge circuit, or the like, and converts it into a DC voltage. In this case, the converted DC voltage is a pulsation current. The rectifying module 210 includes a smoothing circuit. The smoothing circuit is configured as a semiconductor device such as a capacitor, or the like, to smooth the pulsation current into a DC voltage. The driving module 230 receives the smoothed DC voltage.

The driving module 230 converts the DC voltage received from the rectifying unit 200 into a filament current of the magnetron and a driving voltage for driving the magnetron on the basis of the control signals output from the control unit 800. In this case, the control signals are a frequency control signal or a duty control signal. The driving module 230 receives a first control signal from the control unit 800, and converts the DC voltage received from the rectifying module 210 on the basis of the first control signal and supplies current to the filament of the magnetron. Also, the driving module 230 receives a second control signal from the control unit 800, and converts the DC voltage received from the rectifying module 210 on the basis of the second control signal and supplies a driving voltage to the magnetron.

At the initial starting stage, the control unit 800 outputs a control signal for applying a pre-set first current as the filament current, and in a pre-set normal state, the control unit 800 outputs a control signal for changing the filament current into a second current smaller than the first current. In this case, 9 A to 11 A may be used as the first current, and 4 A to 7 A may be used as the second current. Namely, at the initial starting stage, startability (i.e., activation or starting characteristics) of the of the plasma lighting system is secured, and a slightly high current ranging from 9 A to 11 A is applied to the filament of the magnetron 300 in consideration of a change in the temperature characteristics of the magnetron over time.

The driving module 230 includes a first inverter 231 for varying the frequency of the DC voltage into a first AC voltage on the basis of the first control signal, a second inverter 232 for varying the frequency of the DC voltage into a second AC voltage on the basis of the second control signal, a first conversion unit 233 for converting the first AC voltage to generate the filament current, and a first conversion unit 234 for converting the second AC voltage to generate a driving voltage. Of course, the first inverter 231 and the second inverter 232 may be configured as a single inverter unit. Also, the first conversion unit 233 and the second conversion unit 234 can be configured as a single conversion unit, namely, through a transformer. The driving module 230 may further include a high voltage generation unit 235 for increasing the driving voltage output from the second conversion unit 234 to have a high voltage and applying the same to the magnetron.

The first inverter 231 may include switching elements such as insulated gate bipolar transistors (IGBT), or the like. The first inverter 231 may receive a first control signal, a switching control signal, such as a frequency control signal, a duty control signal, or the like, from the control unit 800 and converts the DC voltage input from the rectifying module 210 or a power factor compensation module 220 (to be described) into a first AC voltage on the basis of the first control signal. The first conversion unit 233, a general transformer, converts the first AC voltage according to the first inverter 231 and supplies current to the filament of the magnetron.

The second inverter 232 also includes switching elements such as IGBTs, or the like. The second inverter 232 receives a second control signal, a switching control signal such as a frequency control signal, a duty control signal, or the like, and converts the DC voltage input from the rectifying module 210 or the power factor compensation module 220 into a second AC voltage on the basis of the second control signal. Subsequently, the second conversion unit 234, a general transformer, converts the second AC voltage according to the second inverter 234 and supplies a driving voltage for driving the magnetron.

The high voltage generation unit 235 increases the magnetron driving voltage which has been converted through the second conversion unit 234 and applies the high voltage to the magnetron 300.

The plasma lighting system according to an exemplary embodiment of the present invention may further include the power factor compensation module 220 connected between the rectifying module 210 and the driving module 230 and compensating for a power factor of the DC voltage output from the rectifying module 210. In this case, the control unit 800 may previously store power factor compensation data. Namely, the control unit 800 receives commercial AC power, detects a change state of the commercial AC power, and applies corresponding power factor compensation data to the power factor compensation module 220. The power factor compensation module 220 compensates for a power factor of the DC voltage output from the rectifying module 210 by using the power factor compensation data. Also, the driving module 230 receives DC voltage whose power factor has been compensated for, from the power factor compensation module 220.

Also, the plasma lighting system according to an exemplary embodiment of the present invention may further include an input voltage detection unit 910 for detecting an input voltage input to the rectifying module 210 and an input current detection unit to 920 for detecting an input current input to the rectifying module 210. The control unit 800 controls the power factor compensation module 220 and the driving module 230 including the first inverter 231 and the second inverter 232 on the basis of the detected input voltage and input current.

The plasma lighting system according to an exemplary embodiment of the present invention may further include a light detection unit 930 for detecting light of an electrodeless bulb according to a microwave output to the waveguide. As the light detection unit 930, a photo sensor, a photo transistor, or the like, can be used. The plasma lighting system according to an exemplary embodiment of the present invention includes a photo sensor provided at a bulb stage generating light through the electrodeless bulb, and counts the number of pulses of light according to rotation.

Figure 7:
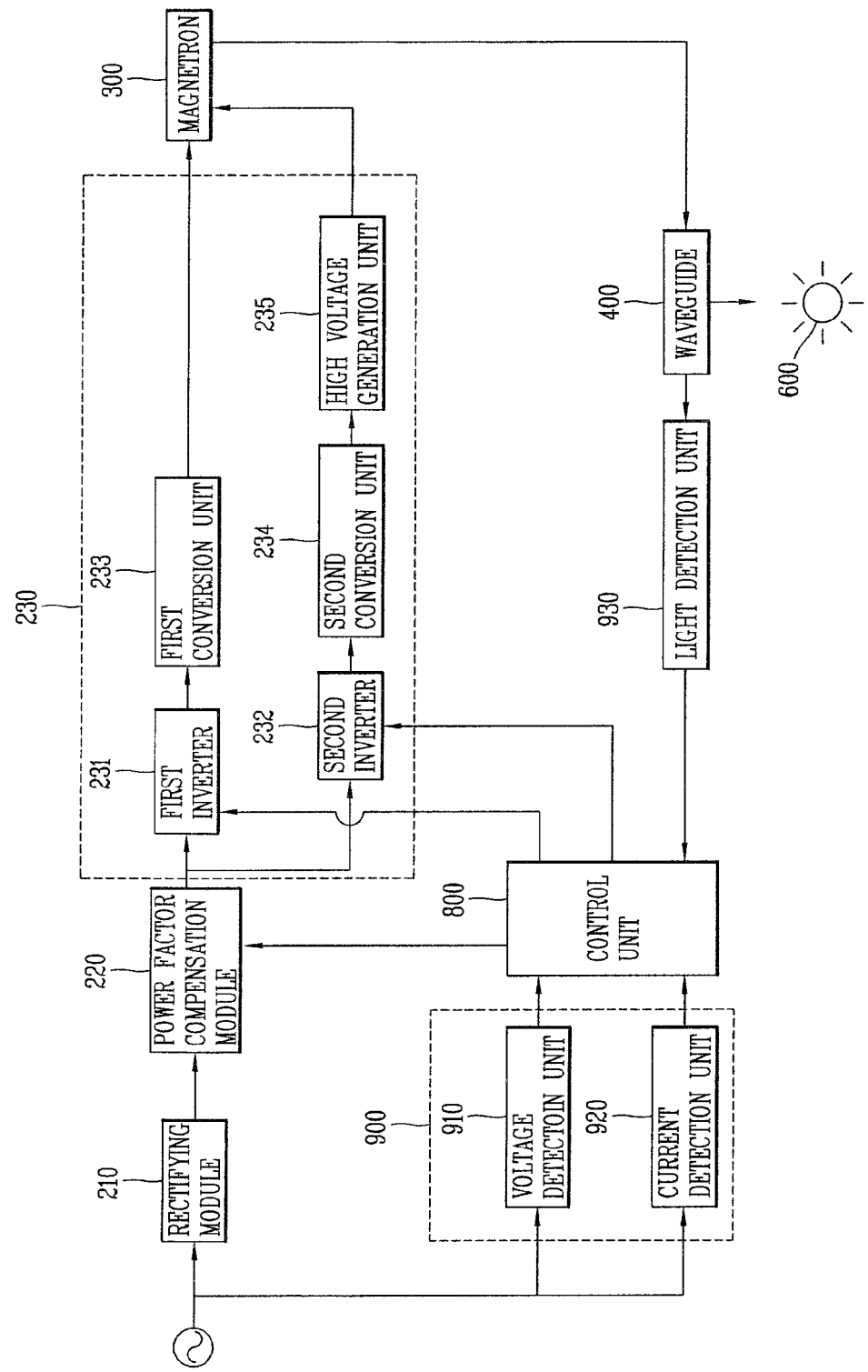
FIG. 7 is a schematic block diagram showing the configuration of the plasma lighting system according to an exemplary embodiment of the present invention.
Figure 11:
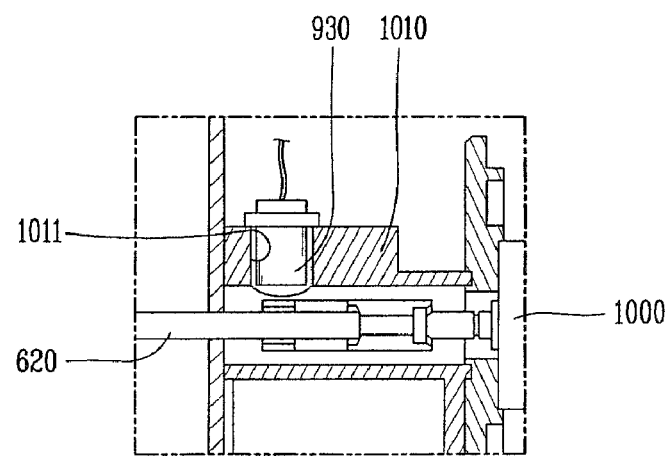
FIG. 11 is an enlarged view of a portion 'B' in FIG. 2.

With reference to FIGS. 2 and 11, the light detection unit 930 is installed between the magnetron 300 and the resonator 500. The plasma lighting system determines whether or not discharging takes place at the light emitting unit 610 of the electrodeless bulb 600 by using the light detection unit 930. When discharging does not take place, the plasma lighting system stops driving of the magnetron 300. By stopping the driving of the magnetron 300, the microwave can be prevented from flowing backward to damage the magnetron, thus protecting the magnetron. As shown in FIG. 7, the light detection unit 930 is electrically connected to the control unit 800 which controls whether or not the magnetron 300 is to be operated.

The light detection unit 930 may be installed near a shaft part 620 integrally connected to the light emitting unit 610 of the electrodeless bulb 600 in order to facilitate an installation operation of the light detection unit 930. To this end, the a bulb motor 1000 is installed to be coupled to the shaft part 620 of the electrodeless bulb 600 between the magnetron 300 and the resonator 500 in order to rotate the electrodeless bulb 600. Also, a sensor hole 1011 for installing the light detection unit 930 is formed at a motor bracket 1010 supporting the bulb motor 1000. The sensor hole 1011 may be formed at a position where light can be easily detected. For example, the sensor hole 1011 may be formed near the shaft part 620. The sensor hole 1011 may be formed to have a proper size in consideration of a leakage of electromagnetic waves.

In this case, the control unit 800 compares the number of pulses of light detected by the light detection unit 930 and a pre-set reference number of pulses. When the number of pulses of the detected light is grater than the reference number of pulses according to the comparison result, the control unit 800 determines that light is normally output. Here, the reference number of pulses may be set to be different according to the characteristics of the plasma lighting system.

The control unit 800 previously sets a reference time (i.e., reference duration), and when the applied time of the first current is greater than a pre-set reference time, the control unit 800 applies a high driving voltage to the magnetron and compares the number of pulses to determine a normal state. For example, the control unit 800 may set the reference duration as four seconds. When four seconds lapse, the control unit 800 outputs the second control signal to the second inverter 232 and applies a high voltage to the magnetron. Thereafter, the control unit 800 determines whether or not a normal state, namely, a stable lighting state, has arrived by using the light detection unit 930. When the control unit 800 determines that the stable lighting state has arrived in which the plasma lighting system generates a certain output or more, the control unit 800 reduces the filament current of the magnetron through the first control signal and supplies the second current. Namely, the control unit 800 changes the filament current of the magnetron from 9 A to 11 A into 4 A to 7 A. Accordingly, the frequency bandwidth of the microwave output from the magnetron and noise can be reduced.

Figure 14:
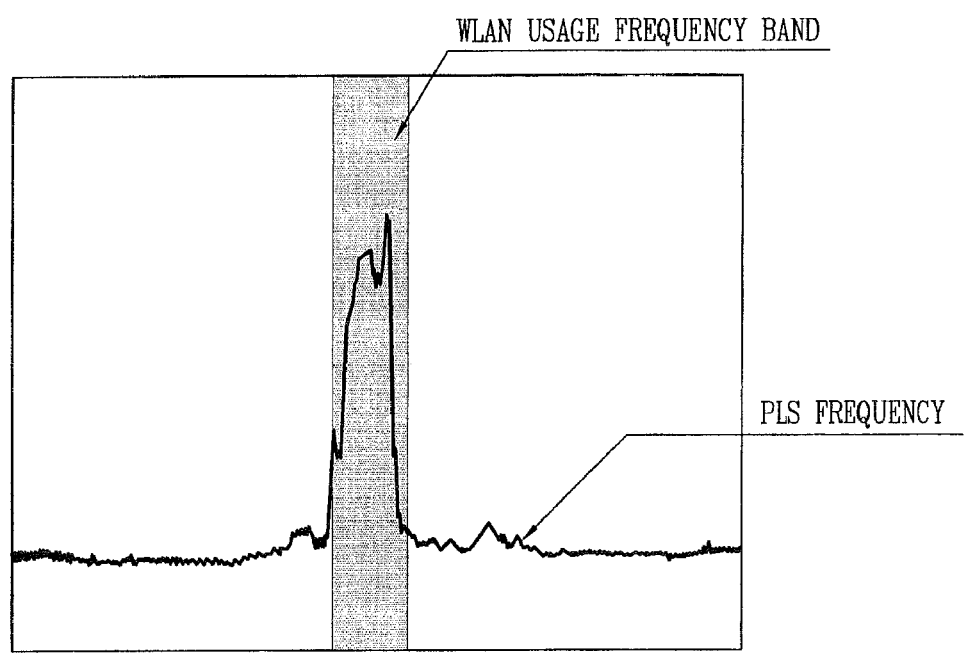
FIG. 14 is a graph showing a communication interference relationship between the related art plasma lighting system and the WLAN device.

With reference to FIG. 14, the WLAN uses the frequency of 2.4 GHz to 2.5 GHz among an ISM Band (Industrial Scientific and Medical Radio Band). In particular, the WLAN uses a frequency band of 2.412 MHz to 2.472 MHz by the unit of 5 MHz with respect to 1 to 11 channels. A microwave oscillated from the general plasma lighting system ranges from 2.45 GHz to 2.46 GHz. Accordingly, the microwave generated from the WLAN usage frequency band and the plasma lighting system causes communication interference over about seven channels.

Figure 9:
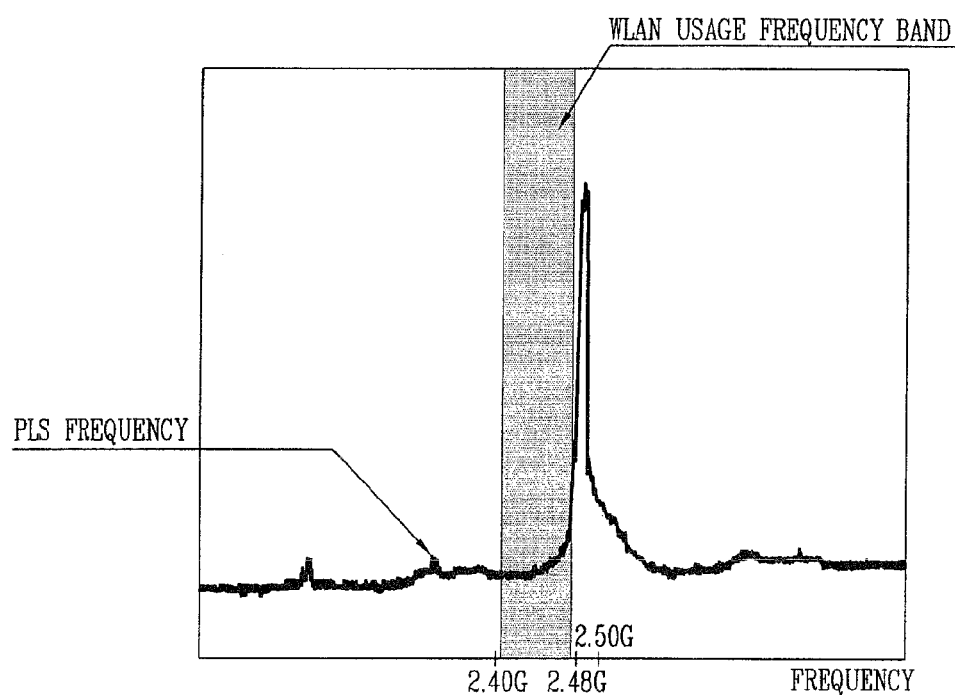
FIG. 9 is a graph showing the relationship between the plasma lighting system according to an exemplary embodiment of the present invention and a wireless local area network (WLAN) device.

Meanwhile, with reference to FIG. 9, the size and shape of the elements constituting the magnetron may be changed. Namely, the separation distance between the vane 330 and the straps 344 and 345 may be increased to avoid communication interference over about the seven channels generated by the microwave of the WLAN usage frequency band and the plasma lighting system.

Figure 8:
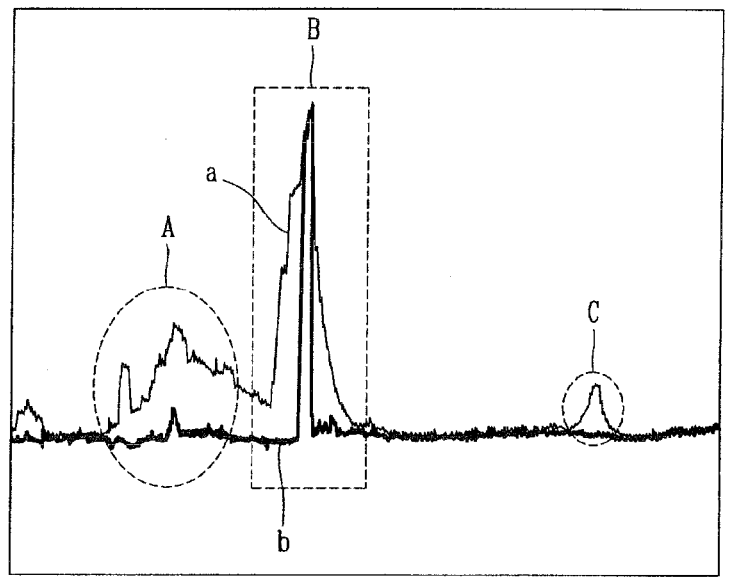
FIG. 8 is a graph showing a change in the characteristics of the plasma lighting system over the change in a filament current according to an exemplary embodiment of the present invention.

With reference to FIG. 8, when the filament current is reduced from 9 A to 6 A in a normal state in which a light output is uniformly maintained, noise in A and C areas can be attenuated, frequency bandwidth can be reduced in a B area, and frequency interference with WLAN can be reduced (from a to b). Also, when the separation distance between the vane 330 and the straps 344 and 345 in the magnetron 300 is increased, the usage frequency of the plasma lighting system according to an exemplary embodiment of the present invention ranges from 2.480 to 2.490. Accordingly, as shown in FIG. 9, the plasma lighting system according to an exemplary embodiment of the present invention can avoid interference with a different electronic device, in particular, the WLAN device, while it is operated at below 2.5 GHz.

Figure 10:
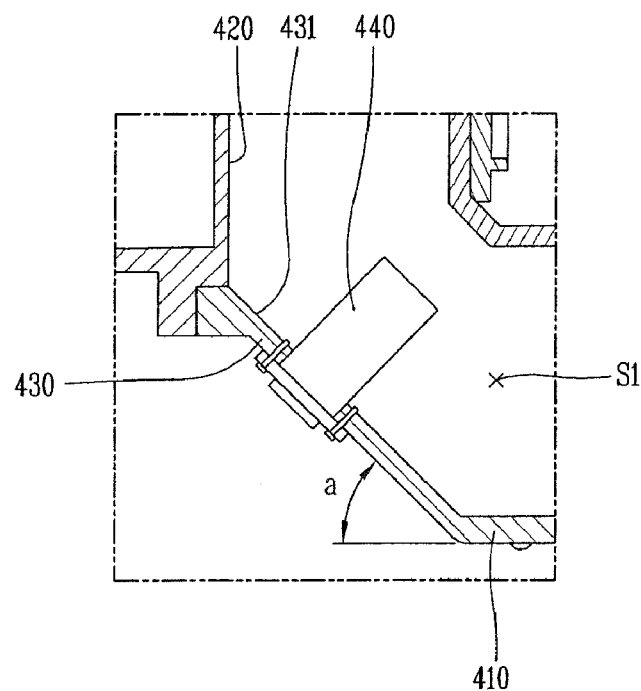
FIG. 10 is an enlarged view of a portion 'A' in FIG. 2.

With reference to FIG. 10, a bent portion 430 having a sloped face 431 is formed between the first waveguide part 410 and the second waveguide part 420 in order to minimize reflection of the microwave oscillated from the magnetron 300. A slope angle ($\alpha$) of the sloped face 431 may range from 40 degree to 50 degree in order to minimize the reflexibility of the microwave. The length of the second waveguide part 420 may vary depending on the frequency size of the microwave. When the frequency of the microwave is 2485 kHz, the second waveguide 420 may have a length of about $\lambda_g/4$, namely, 40 mm to 45 mm, in order to minimize the amount of reflection of the microwave.

With reference to FIGS. 2 and 10, an impedance matching member (referred to as a 'stub', hereinafter) 440 is installed to be inserted into the interior of the waveguide space by a certain length at the center of the sloped face 431 to make optimum impedance matching according to a change in a load. The stub 440 may be made of a metal material such as copper or aluminum or may have a bar-like shape or a hollow bar-like shape. The stub 440 may be screw-fastened such that its insertion depth can be varied. In this case, the size or insertion depth of the stub 440 is automatically determined when a load of the lighting system and a source (oscillation frequency, RS power) are matched, so the stub 440 is preferably fixedly coupled to the sloped face 431 of the waveguide 400. In this case, the diameter of the stub 440 ranges from 10 mm to 12 mm, and the insertion depth may range from 20 mm to 24 mm.

With reference to FIG. 7, a plasma lighting system according to a different exemplary embodiment of the present invention includes a magnetron 300 configured to oscillate a microwave, a power source unit 200 including a rectifying module 210 for converting commercial power into a DC voltage and a driving module 230 for converting the DC voltage into a filament current and a driving voltage and applying the same to the magnetron according to a control signal, a waveguide 400 connected to the magnetron 300 and having a waveguide space to deliver the microwave, an electrodeless bulb 600 charged with a luminous material excited by the microwave and turned into a plasma state to emit light, a resonator 500 formed to have a mesh form and having a resonance space accommodating the electrodeless bulb 600 and connected to the waveguide 400; and a control unit 800 configured to output the control signal to the power source unit 200 and provide control to apply a filament current lower than a filament current at an initial starting stage, to the magnetron when a pre-set normal state arrives, wherein the microwave has an oscillation frequency ranging from 2,480 MHz to 2,490 MHz.

At the initial starting stage, the power source unit 200 applies a pre-set first current as the filament current, and in a pre-set normal state, the power source unit 200 changes the filament current into a second current smaller than the first current, and applies the same. In this case, 9 A to 11 A may be used as the first current, and 4 A to 7 A may be used as the second current.

With reference to FIGS. 3 to 6, the magnetron 300 includes an anode cylinder 320 provided at an inner side of the yoke and the plurality of vanes 330 having accommodating recesses formed at upper and lower end portions, radially disposed at the inner side of the anode cylinder and inducing a microwave component, and two pairs of straps 344 and 345 accommodated to be alternately brought into contact with the accommodating recesses of the plurality of vanes. Here, the plurality of vanes and the two straps form a resonance circuit, and a distance is formed between the plurality of vanes and the straps not connected to the plurality of vanes to allow the microwave to have the oscillation frequency.

A repeated description with the former exemplary embodiment will be omitted.

Hereinafter, the operation of the plasma lighting system according to exemplary embodiments of the present invention will now be described.

When a driving signal is input to the power source unit 200, the power source unit 200 increases AC power and supplies the increased high voltage to the magnetron 300. While being oscillated by the high voltage, the magnetron 300 generates microwave having a very high frequency. The microwave is discharged to outside of the magnetron 300 through the antenna unit 310 of the magnetron 300, and the discharged microwave is guided to the waveguide space S1 of the waveguide 400. The microwave guided to the waveguide space S1 of the waveguide 400 is delivered from the first waveguide part 410 to the second waveguide part 420, guided to the interior of the resonator 500 through the emission slot 421 of the second waveguide part 420 so as to be radiated, and a resonance mode is formed in the interior of the resonator 500 by the radiated microwave. Then, a discharge material charged in the electrodeless bulb 600 is excited according to the resonance mode formed in the interior of the resonator 500 so as to be continuously turned into plasma to emit light having a unique emission spectrum, and the light is reflected by the reflector 700 to the front side to illuminate the space.

Here, the magnetron 300 and the resonator 500 are installed at one side of the waveguide 400, namely, at one side substantially on the basis of a lengthwise direction of the waveguide space S1 in a state in which the first waveguide part 410 and the second waveguide part 420 are bent. Thus, the magnetron 300 and the resonator 500 are relatively disposed to close to each other, whereby an unnecessary space can be reduced to reduce the size of the plasma lighting system, an installation space for installing the plasma lighting system can be reduced, and an installation operation can be facilitated.

Because the first waveguide part 410 and the second waveguide part 420 of the waveguide 400 are bent, the microwave oscillated from the magnetron 300 is reflected from the bent portion 430 formed between the first waveguide part 410 and the second waveguide part 420 so as to be returned to the magnetron 300. However, because the sloped face 431 is formed on the bent portion 430 between the first waveguide part 410 and the second waveguide part 420, the microwave delivered from the first waveguide is part 410 can smoothly move toward the second waveguide part 420 by virtue of the sloped face 431. Accordingly, degradation of the life span of the plasma lighting system can be prevented and a luminous efficiency can be improved.

Because the stub 440 is installed on the sloped face 431, it can actively cope with an impedance change according to a change in a load ranging from a high output to a low output, whereby plasma lighting systems having various standards can be provided.

Because the light detection unit 930 is installed near the shaft part 620 of the electrodeless bulb 600 to detect light delivered through the shaft part 620, thereby determining illumination has occurred. When light is not detected, it is determined that illumination has not occurred and the magnetron is quickly stopped to prevent the magnetron from being damaged.

Also, the magnetron makes the oscillation frequency range from 2,480 MHz to 2,490 MHz, by using the plurality of vanes including the accommodating recesses formed at upper and lower end portions and radially disposed in the interior of the anode cylinder to induce the microwave and the two pairs of straps accommodating in the accommodating recesses of the plurality of vanes such that they are alternately brought into contact with the accommodating recesses.

Also, in the plasma lighting system, when the filament current is lowered in the normal state in which a light output is uniformly maintained, noise is attenuated and a frequency band is reduced. Then, the used bandwidth of the microwave is reduced to reduce frequency interference with the WLAN. In conjunction, when the structure of the vanes and the straps in the magnetron is changed, the usage frequency ranges from 2,480 MHz to 2,490 MHz. Accordingly, channel interference with a different electronic device, in particular, the WLAN device, can be avoided while the plasma lighting system operates at below 2.5 GHz.

Figure 12:
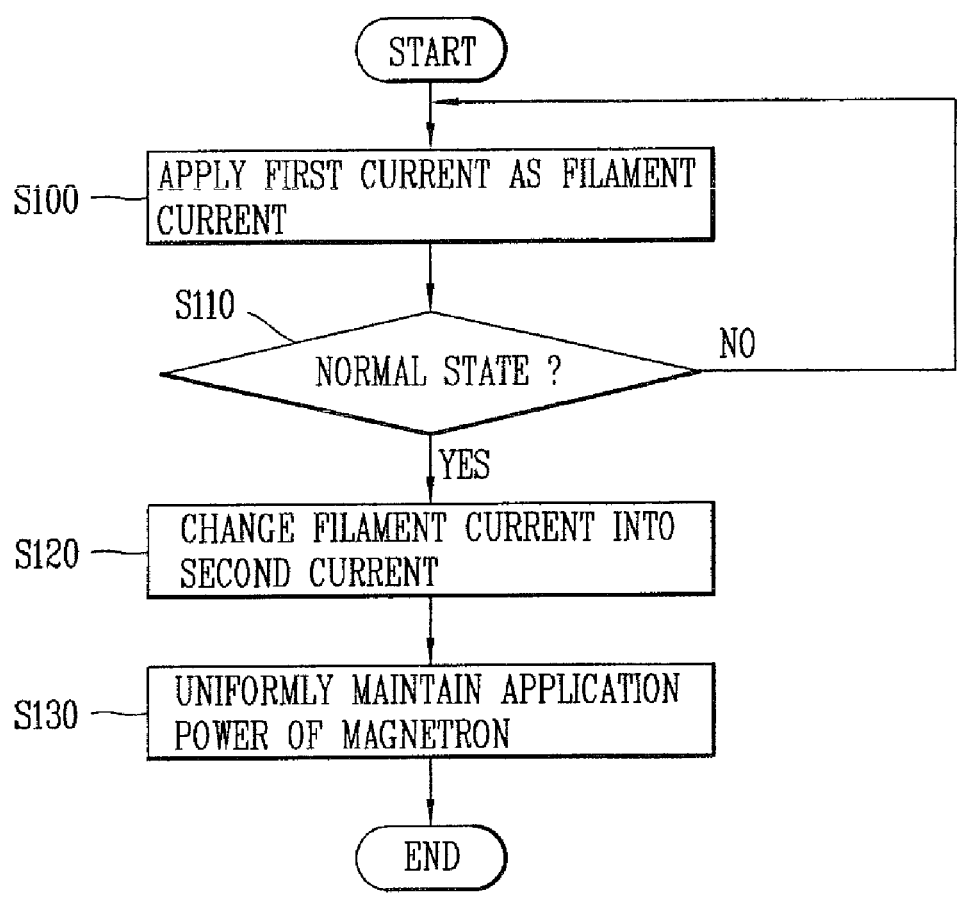
FIGS. 12 and 13 are flow chart illustrating the process of a method for is controlling a plasma lighting system according to an exemplary embodiment of the present invention.

With reference to FIG. 12, a method for controlling a plasma lighting system according to an exemplary embodiment of the present invention includes an initial start step (S100) of applying a pre-set first current as a filament current of the magnetron, a normal state determining step (S110) of determining whether or not a pre-set normal state has arrived, and a filament current changing step (S120) of changing the filament current into a second current smaller than the first current when the normal state has arrived.

Here, the normal state determining step (S110) includes an initial start time determining step (not shown) of determining whether or not the applied time of the first current is greater than a pre-set reference time (i.e., a pre-set reference period of time, or a pre-set reference duration), a driving voltage application step (not shown) of applying a high driving voltage to the magnetron when it is determined that the applied time of the first current is greater than the pre-set reference time, a light detection step (not shown) of detecting light of the electrodeless bulb according to microwave output from the magnetron to the waveguide, and a pulse number comparison step (not shown) of comparing the number of pulses of the detected light and a pre-set reference number of pulses. When the number of pulses of the detected light is greater than the reference number of pulses, it is determined that the plasma lighting system is in a normal state.

The method for controlling a plasma lighting system according to an exemplary embodiment of the present invention may further include: an input power maintaining step (S130) of uniformly maintaining overall power applied to the magnetron. In the input power maintaining step (S130), the driving voltage of the magnetron is increased is by the reduced filament current and supplied.

In the initial starting stage, the pre-set first current is applied as the filament current and maintained (S100). In this case, the first current ranging from 9 A to 11 A is preferably used. Namely, at the initial starting stage, the startability (or activation) of the plasma lighting system is secured, and a slightly higher current ranging from 9 A to 11 A is applied to the filament of the magnetron in consideration of a change with time such as a change according to temperature characteristics of the magnetron.

In the normal state determining step (S110), light according to microwave output from the magnetron is detected, and the number of pulses of the detected light and the pre-set reference number of pulses are compared. When the number of pulses of the detected light is greater than the reference number of pulses, it is determined that the plasma lighting system is in a normal state. Here, the reference number of pulses may set to vary depending on the characteristics of the plasma lighting system.

In the normal state determining step (S110), when the applied time of the first current is greater than the pre-set reference time, a high voltage is applied to the magnetron, and the numbers of pulses are compared to determine whether or not the plasma lighting system is in a normal state.

When it is determined that the plasma lighting system has reached a stable lighting state, the filament current of the magnetron is reduced through the first control signal to supply the second current (step S120). Here, 4 A to 7 A of the second current is preferably used. Namely, the filament current of the magnetron is changed from the 9 A to 11 A to 4 A to 7 A. Accordingly, the frequency band of the microwave output from the magnetron can be reduced and noise can be also reduced. Namely, as shown in FIG. 8, when the filament current is reduced from a to b, namely, from 9 A to 6 A, noise in the areas A and C can be attenuated, the frequency bandwidth in the area B can be reduced, and frequency interference with the WLAN can be avoided.

Thereafter, the overall power applied to the magnetron in the plasma lighting system can be attenuated is uniformly maintained. Namely, the driving voltage of the magnetron is increased by the reduced filament current so as to be supplied. Accordingly, the life span of the magnetron can be lengthened, noise can be reduced, and the operation efficiency of the plasma lighting system can be improved.

Figure 13:
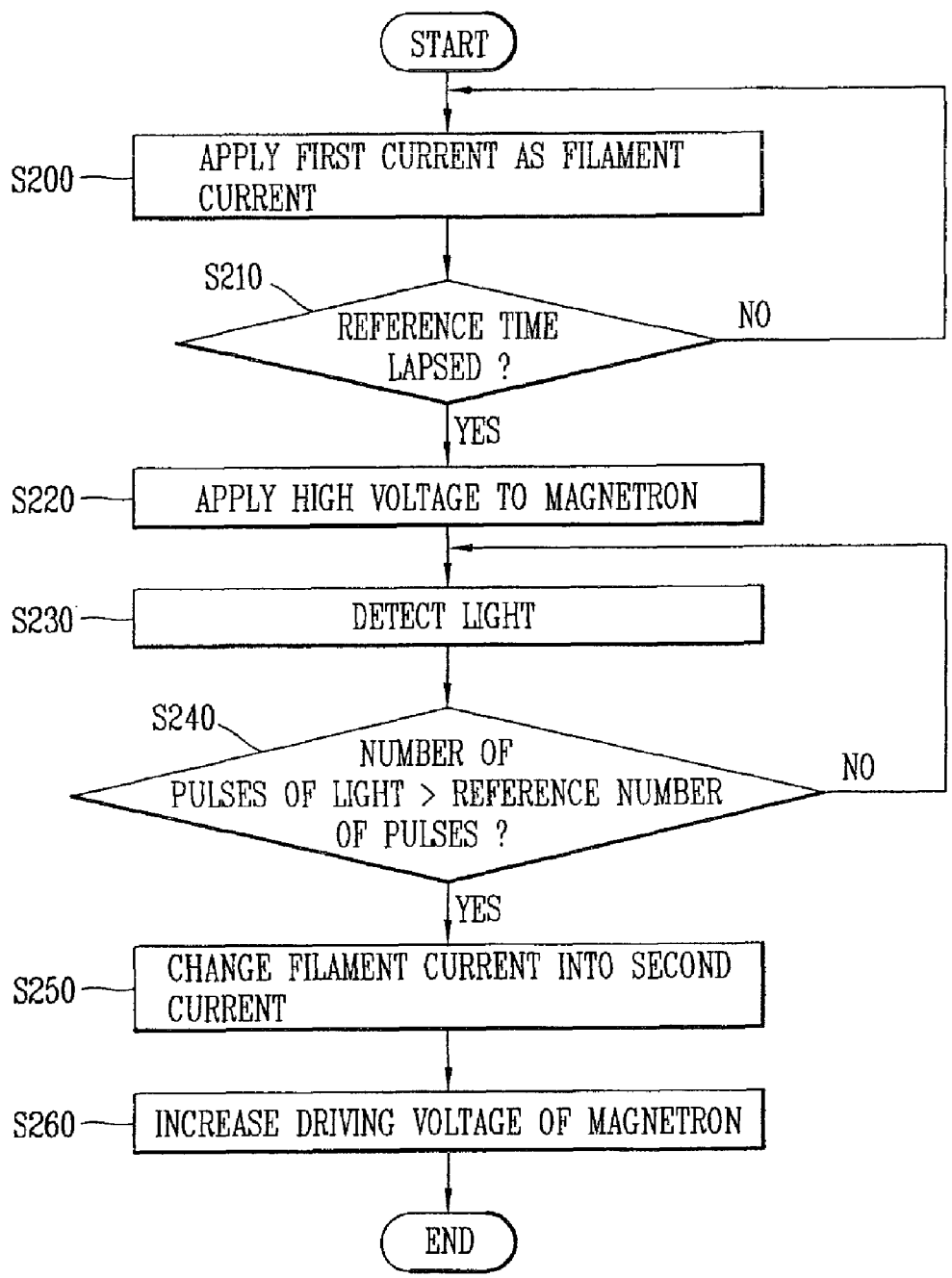

With reference to FIG. 13, a method for controlling a plasma lighting system according to an exemplary embodiment of the present invention includes a first step (S200) of starting the plasma lighting system by applying a filament current of the magnetron higher than a pre-set first current, a second step (S210) of determining whether or not a pre-set reference time has lapsed; a third step (S220) of applying a high driving voltage to the magnetron when the pre-set reference time has lapsed; a fourth step (S230) of detecting light of the electrodeless bulb according to microwave output from the magnetron to the waveguide; a fifth step (S240) of comparing the number of pulses of the detected light and a pre-set reference number of pulses, a sixth step (not shown) of determining that the plasma lighting system is in a normal state when the number of pulses of the detected light is greater than the reference number of pulses, and a seventh step (S250) of changing the filament current into a second current which is smaller than the first current, when the plasma lighting system reaches the normal state. The method may further include: an eighth step (S260) of increasing the driving voltage of the magnetron by the reduced filament current and supplying the increased driving voltage.

When the plasma lighting system is initially started or actuated, the pre-set first current is applied as the filament current and maintained (step S200), and it is determined whether or not the applied time of the first current is greater than the pre-set reference time (step S210). When the applied time of the first current is greater than the pre-set reference time, a high voltage is applied to the magnetron (step S220) and the numbers of pulses are compared to determine whether or not the plasma lighting system is in a normal state. For example, the reference time may be set to 4 seconds, and in this case, when four seconds lapse, the high voltage is applied to the magnetron according to the second control signal. Thereafter, the plasma lighting system detects the light to determine whether or not it has reached a normal state, namely, a stable lighting state. In other words, the light according to microwave output from the magnetron is detected (step S230), and the number of pulses of the detected light and the pre-set reference number of pulses are compared (step S240). Upon comparison, when the number of pulses of the detected light is greater than the reference number of pulses, it is determined that the plasma lighting system is in a normal state. Here, the reference number of pulses may be set to vary depending on the characteristics of the plasma lighting system.

When it is determined that the plasma lighting system determines has reached a stable lighting state, the filament current of the magnetron is reduced through the first control signal to supply the second current (step S250). Namely, the filament current of the magnetron is changed from 9 A to 11 A to 4 A to 7 A. Accordingly, the frequency band of the microwave output from the magnetron can be reduced to reduce noise. Namely, as shown in FIG. 8, when the filament current is reduced from 9 A to 6 A, noise in the areas A and C can be attenuated, the frequency bandwidth in the area B can be reduced, and frequency interference with WLAN can be avoided.

Thereafter, the overall power applied to the magnetron is uniformly maintained, and the driving voltage of the magnetron is supplied upon increasing such by an amount equaling the reduced filament current (step S260). Accordingly, the life span of the magnetron can be lengthened, noise can be reduced, and the operation efficiency of the plasma lighting system can be improved.

As so far described, the plasma lighting system can avoid interference with an electronic device using the same frequency band by changing the shape of the vanes constituting the magnetron. Also, because the filament current of the magnetron applied at the initial starting stage and that applied in the normal state are different, interference with the WLAN can be avoided and noise can be attenuated, and in addition, because the resonator has the mesh form, the efficiency can be further increased. Moreover, because the rectangular waveguide is bent at a right angle and the magnetron and the resonator are disposed at one side on the basis of the waveguide space of the waveguide, the size and installation space of the plasma lighting system can be reduced.

What is claimed is:

1. A plasma lighting system comprising:
   a magnetron including a plurality of vanes having accommodating recesses at upper and lower end portions and two pairs of straps accommodated in the accommodating recesses such that they are respectively and alternately brought into contact with the accommodating recesses, said magnetron providing oscillating microwaves that have an oscillation frequency determined by the plurality of vanes and the straps;
   a waveguide connected to the magnetron and having a waveguide space to deliver the microwave;
   an electrodeless bulb charged with a luminous material and emitting light according to the microwave;
   a resonator formed to have a mesh form and having a resonance space accommodating the electrodeless bulb and connected to the waveguide;
   a power source unit configured to convert commercial power into a driving voltage and a filament current and to apply the same to the magnetron; and
   a control unit configured to output a control signal for converting the commercial power into the driving voltage and the filament current to the power source unit and to provide control to apply a filament current, that has a lower magnitude than that applied at an initial starting stage, to the magnetron when a pre-set normal state arrives.

2. The plasma lighting system of claim 1, wherein the oscillation frequency is set to avoid interference with an external electronic device using a frequency of 2.4 GHz to 2.5 GHz band.

3. The plasma lighting system of claim 1, wherein the distance between a vane which is not in contact with the straps, among the plurality of vanes, and the straps is formed such that the oscillation frequency ranges from 2,480 MHz to 2,490 MHz.

4. The plasma lighting system of claim 1, further comprising:
   a light detection unit configured to detect light emitted by the electrodeless bulb.

5. The plasma lighting system of claim 4, wherein the control unit compares the number of pulses of the detected light and a reference number of pulses, and when the number of pulses of the detected light is greater than the reference number of pulses, the control unit determines that the plasma lighting system is in a normal state.

6. The plasma lighting system of claim 5, wherein when the applied time of the first current is greater than a pre-set reference time, the control unit applies the driving voltage to the magnetron and compares the numbers of pulses to determine whether or not the plasma lighting system is in a normal state.

7. The plasma lighting system of claim 1, wherein the power source unit comprises:
   a rectifying module configured to convert the commercial power into a DC voltage; and
   a driving module configured to convert the DC voltage into the driving voltage and the filament current.

8. The plasma lighting system of claim 7, wherein the driving module comprises:
   a first inverter configured to convert the DC voltage into a first AC voltage;
   a second inverter configured to convert the DC voltage into a second AC voltage;
   a first conversion unit configured to convert the first AC voltage into the filament current according to the control signal;
   a second conversion unit configured to convert the second AC voltage into the driving voltage according to the control signal; and
   a high voltage generation unit configured to increase the driving voltage to a high driving voltage.

9. The plasma lighting system of claim 8, further comprising:
   a power factor compensation module connected between the rectifying module and the driving module and compensating for a power factor of the DC voltage output from the rectifying module.

10. The plasma lighting system of claim 1, wherein the waveguide comprises first and second waveguide parts formed to be bent in a direction in which the magnetron is coupled, and the magnetron and the resonator are coupled to the first and second waveguide parts, respectively.

11. The plasma lighting system of claim 10, wherein the first and second waveguide parts are bent at a right angle and a sloped face is formed on the bent portions, respectively.

12. The plasma lighting system of claim 11, wherein the waveguide comprises an impedance matching member installed on the sloped face and matching impedance according to the strength of the microwave.

13. The plasma lighting system of claim 1, wherein a slot is formed between the waveguide and the resonator in order to induce double resonance.

14. A plasma lighting system comprising:
   a magnetron configured to oscillate a microwave;
   a power source unit including a rectifying module for converting commercial power into a DC voltage and a driving module for converting the DC voltage into a filament current and a driving voltage and applying the same to the magnetron according to a control signal;
   a waveguide connected to the magnetron and having a waveguide space to deliver the microwave;
   an electrodeless bulb charged with a luminous material excited by the microwave and turned into a plasma state to emit light;
   a resonator formed to have a mesh and having a resonance space accommodating the electrodeless bulb and connected to the waveguide; and
   a control unit configured to output the control signal to the power source unit and control to apply a filament current lower than a filament current at an initial starting stage, to the magnetron when a pre-set normal state arrives, wherein the microwave has an oscillation frequency ranging from 2,480 MHz to 2,490 MHz.

15. The plasma lighting system of claim 14, wherein the power source unit applies a pre-set first current as the filament current at an initial starting stage, and changes the filament current into a second current, which is smaller than the first current, or lower and applies the same in a pre-set normal state.

16. The plasma lighting system of claim 15, wherein the first current ranges from 9 A to 11 A, and the second current ranges from 4 A to 7 A.

17. The plasma lighting system of claim 14, wherein the magnetron comprises:
   an anode cylinder formed at an inner side of a yoke and having a cylindrical shape;
   a plurality of vanes having accommodating recesses formed at upper and lower end portions and radially disposed in the interior of the anode cylinder to induce the microwave to the interior of the anode cylinder; and
   two pairs of straps accommodated in the accommodating recesses such that they are alternately brought into contact the accommodating recesses.

18. The plasma lighting system of claim 17, wherein the plurality of vanes and the two straps form a resonance circuit, and a distance is formed between the plurality of vanes and the straps not connected to the plurality of vanes in order to allow the microwave to have the oscillation frequency.

19. The plasma lighting system of claim 14, further comprising:
   a light detection unit configured to detect light emitted by the electrodeless bulb.

20. The plasma lighting system of claim 19, wherein the control unit compares the number of pulses of the detected light and the reference number of pulses, and when the number of pulses of the detected light is greater than the reference number of pulses, the control unit determines that the plasma lighting system is in a normal state.

21. The plasma lighting system of claim 20, wherein when an applied time of the first current is greater than a pre-set reference time, the control unit applies the driving voltage to the magnetron and compares the numbers of pulses to determine whether or not the plasma lighting system is in a normal state.

22. The plasma lighting system of claim 14, wherein a slot is formed between the waveguide and the resonator in order to induce double resonance.

* * * * *